United States Patent [19]

Cazenave et al.

[11] Patent Number: 4,781,454

[45] Date of Patent: Nov. 1, 1988

[54] OPTICAL TELEMETRY SYSTEM INCORPORATING A COLLIMATOR

[75] Inventors: Alain Cazenave, Sevres; Roland P. P. Tierrez, Montmagny, both of France

[73] Assignee: Hispano Suiza, St. Cloud, France

[21] Appl. No.: 843,393

[22] Filed: Mar. 24, 1986

[30] Foreign Application Priority Data

Apr. 3, 1985 [FR] France ............................ 85 05031

[51] Int. Cl.[4] .......................... G01C 3/10; G01B 11/00
[52] U.S. Cl. ......................................... 356/1; 356/390
[58] Field of Search ...................... 356/1, 4, 390, 28.5

[56] References Cited

U.S. PATENT DOCUMENTS

| | | |
|---|---|---|
| 2,340,623 | 2/1944 | Simmon . |
| 2,632,357 | 3/1953 | Mihalyi . |
| 3,002,093 | 9/1961 | Kis et al. . |
| 3,554,646 | 1/1971 | Carlson ................................. 356/1 |
| 3,796,492 | 3/1974 | Cullen et al. ........................ 356/1 |
| 4,004,852 | 1/1977 | Pentecost ............................. 356/1 |
| 4,009,960 | 3/1977 | Feldman et al. .................... 356/1 |
| 4,290,693 | 9/1981 | Stein .................................... 356/1 |
| 4,304,474 | 12/1981 | Stein .................................... 356/1 |
| 4,373,804 | 2/1983 | Pryor et al. .......................... 356/4 |
| 4,465,366 | 8/1984 | Schmidt ............................... 356/1 |
| 4,470,696 | 9/1984 | Ballard .............................. 356/28.5 |
| 4,477,185 | 10/1984 | Berger et al. ....................... 356/1 |
| 4,652,749 | 3/1987 | Stein .................................... 356/1 |

FOREIGN PATENT DOCUMENTS 425511 6/1911 France .
1349111 12/1963 France .

OTHER PUBLICATIONS

Naval Engineers Journal, vol. 88, No. 2, Apr. 1976, pp. 180–190; S. Feldman et al.: "Automatic Passive Low Light Level Television Gun–Director Rangefinder".

Primary Examiner—Stephen C. Buczinski
Assistant Examiner—Linda J. Wallace
Attorney, Agent, or Firm—Oblon, Fisher, Spivak, McClelland & Maier

[57] ABSTRACT

A telemetry system comprises a video camera of the kind such that, as a result of the substantial magnification provided, it is necessary also to use a collimating video camera. The use of the collimating camera is rendered possible by mirrors which enable the telemetry operation to be carried out on a virtual object. The system is of especial value in installations which are hostile and inaccessible to human beings.

5 Claims, 5 Drawing Sheets 4,781,454

OPTICAL TELEMETRY SYSTEM INCORPORATING A COLLIMATOR

BACKGROUND OF THE INVENTION

1. Field of the Invention

This invention relates to optical telemetry systems.

2. Summary of the Prior Art

Conventional telemetry systems are based on a principle which involves formation of an image of an object by the superposition of two images of the same object derived from two different optical paths each path comprising at least one reflection on a first mirror rotatable about an axis, the two axes being parallel to one another. In such systems, a bi-univocal relationship exists between the distance to be measured and the angular orientation of the mirrors. Knowledge of this orientation, at the instant of when the images are precisely superposed, is thus equivalent to the knowledge of the distance to be measured. When the telemetry is to be carried out over short distances, it is, moreover well known to employ identical path lengths for the two optical paths, thus enabling the images to have the same outline, which is essential to provide perfect superposition and thus to achieve precise measurement.

The invention relates more particularly to a system of the kind hereinbefore outlined in which the observation of the image produced is carried out by means of a video camera. For numerous industrial applications, it is necessary that the optical system of such a video camera should have a high magnification, therefore a reduced angular field of vision. The use of a collimating system with a larger angular field of vision also provided by video camera, is necessary so as to facilitate exploitation by providing, in addition, an image of the surroundings.

SUMMARY OF THE INVENTION

The present invention has for its object to resolve the problems imposed by the simultaneous utilisation of two video cameras in an optical collimating telemetry system by employing a system of the kind in which an image of an object is produced by the superposition of two images derived from the two different optical paths but of the same lengths each involving at least one reflection on a first mirror movable in rotation about one axis, the two axes being parallel to one another, the said image defining with a reference point a first optical axis.

According to the present invention there is provided in a collimating telemetry optical system two first mirrors rotatable each about an axis lying parallel to the axis of the other and each lying in a respective, different optical path from an object to superposed images of the object, the two optical paths being of the same length, the said image defining with a reference point a first optical axis, and two second, co-planar, mirrors each located on a respective one of said optical paths and symmetrically with respect to the first optical axis, the arrangement being such that the telemetry is carried out on a virtual object, the image thus produced defining with the virtual object a second optical axis.

By means of this system the collimation can easily be effected in relation to a real object, on the first optical axis. Preferably a third mirror, which lies between the second mirrors, intercepts the first optical axis so that collimation will be effected, by reflection on this third mirror, of a virtual object. The third mirror is preferably rigid with the second mirrors and the assembly thus formed is rotatable about a common axis perpendicular to the plane defined by the first and the second optical axes. An angle indicator, connected to the assembly constituted by the second and third mirrors, may provide angular orientation information of the said assembly which, in combination with the telemetry information enables the determination of polar coordinates of the location of a telemetry object situated at any point in a plane defined by the first and the second optical axes.

BRIEF DESCRIPTION OF THE DRAWINGS

FIGS. 4 and 4A are views in plan enabling a better understanding of the system of FIG. 3.

DESCRIPTION OF THE PRIOR ART

Figure 1:
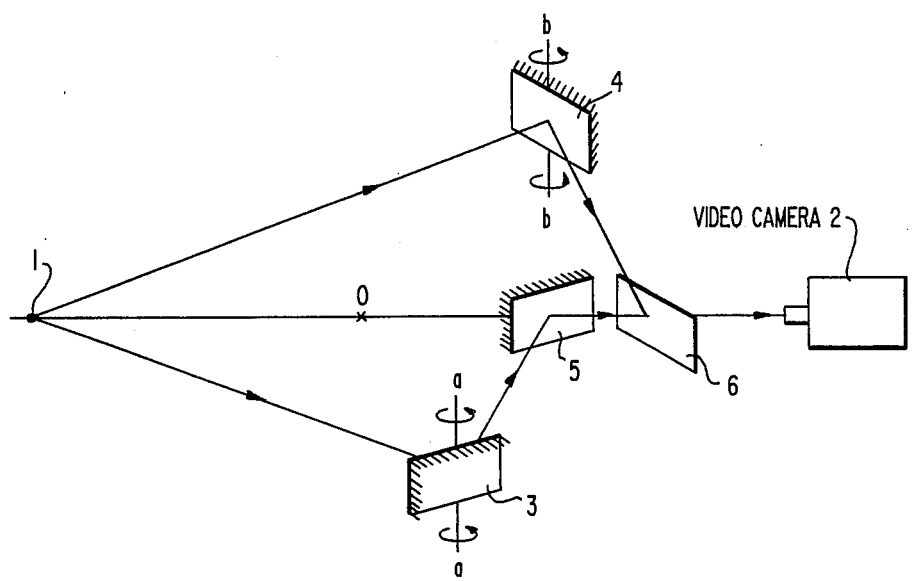
FIG. 1 illustrates an optical telemetry system in accordance with the prior art.

In the known device illustrated in FIG. 1, an image of an object 1 is observed by means of a video camera 2. This image of the object 1 is produced by superposition of two images of the same object derived from two different optical paths comprising at least one reflection in a first mirror, respectively 3 and 4, movable in rotation about an axis, respectively aa and bb, the two axes aa and bb being parallel to one another. The light beam issued, after reflection, from the mirror 3 is again reflected by a fixed mirror 5 in the direction of the camera 2 while the light beam issued from mirror 4 is superposed on the preceding one by reflection on a fixed semi-reflecting mirror 6 located between the fixed mirror 5 and the video camera 2. As a result of this arrangement the optical paths have identical lengths, which is essential in order to provide accurate superposition of the images when the device is required to measure over short distances.

The rotations of the movable mirrors 3 and 4, about respective axes aa and bb, are synchronized without angular play, any rotation of the one giving rise to a similar rotation of the other in the correct sense.

In this way, a bi-univocal relation exists between the angular orientation of the mirrors and the distance to be measured separating the object 1, from a reference point 0 defining with the object 1, a first optical axis constituting an axis of symmetry for the axes aa and bb.

When the video camera has a reduced angular field of vision, a collimating system, with a larger angular field, also provided by a video camera, must be used. In the system of FIG. 1, it is impossible to arrange such a camera on the optical axis. This is the reason why it is proposed, in accordance with the invention, to make use of the system of FIG. 2.

DESCRIPTION OF THE PREFERRED EMBODIMENTS

Figure 2:
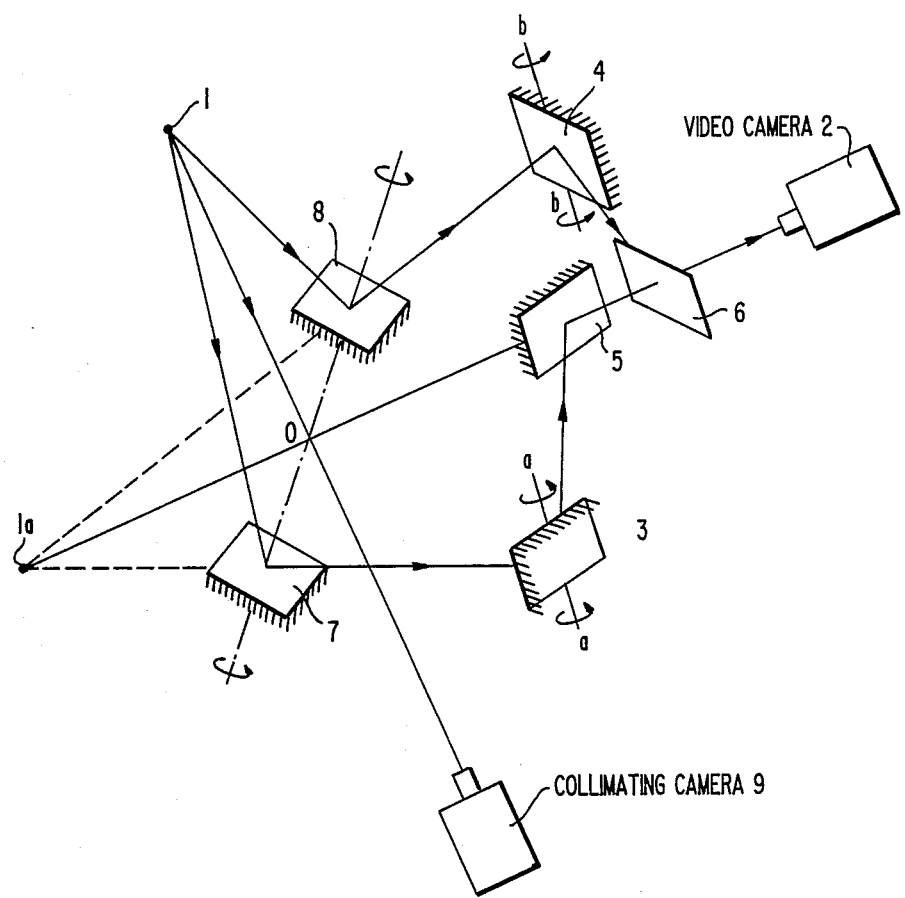
FIG. 2 illustrates an optical telemetry system equipped with a collimating system in accordance with the invention.

In FIG. 2, the same elements are illustrated as in FIG. 1 and corresponding parts have been given the same reference numerals. In the optical paths between the object 1 and the two first mirrors 3 and 4, two second mirrors are located, respectively 7 and 8, so that the telemetry operation is no longer effected in relation to the object 1 but in relation to a virtual object 1a. Thus, the collimating camera 9 having a low magnification can be placed on the first optical axis 1-0. The mirrors 7 and 8 are coplanar and occupy positions such that their common plane will be perpendicular to the optical plane defined by the optical axes 1-0 and 1a-0.

Figure 3:
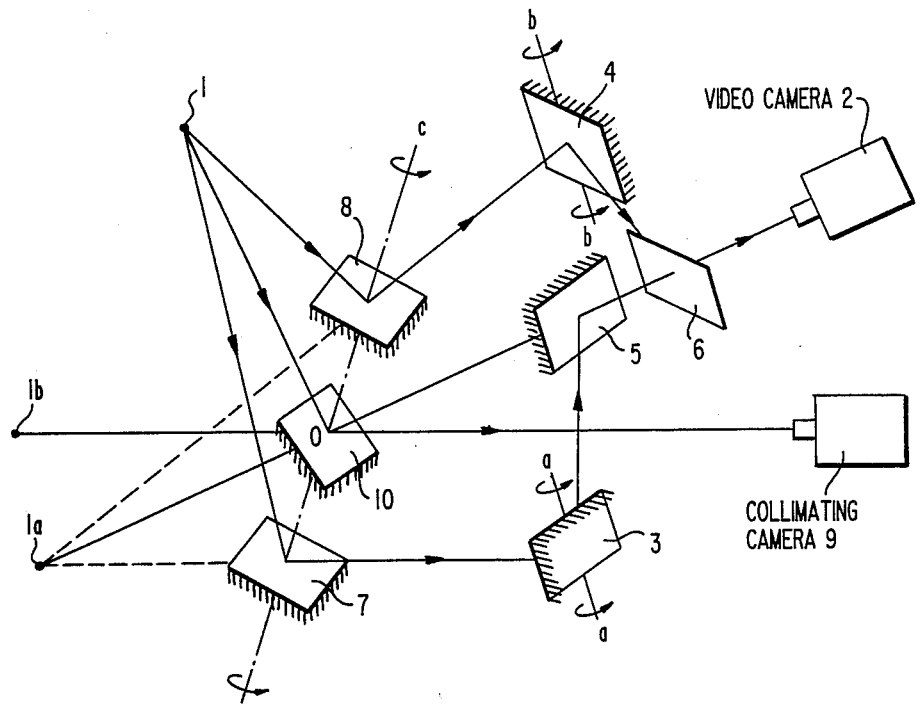
FIG. 3 illustrates an improvement in the system of FIG. 2.

In the system illustrated in FIG. 3, the collimating camera 9 no longer works on the real object 1 but on a virtual object 1b. In order to produce this result, a third mirror 10 is placed between the second mirrors 7 and 8 so as to intercept the first optical axis 1-0. Mirror 10 is rigid with the mirrors 7 and 8 and the assembly thus formed is rotatable about an axis cc perpendicular to the optical plane defined by the axes 1-0 and 1a-0.

Figure 4:
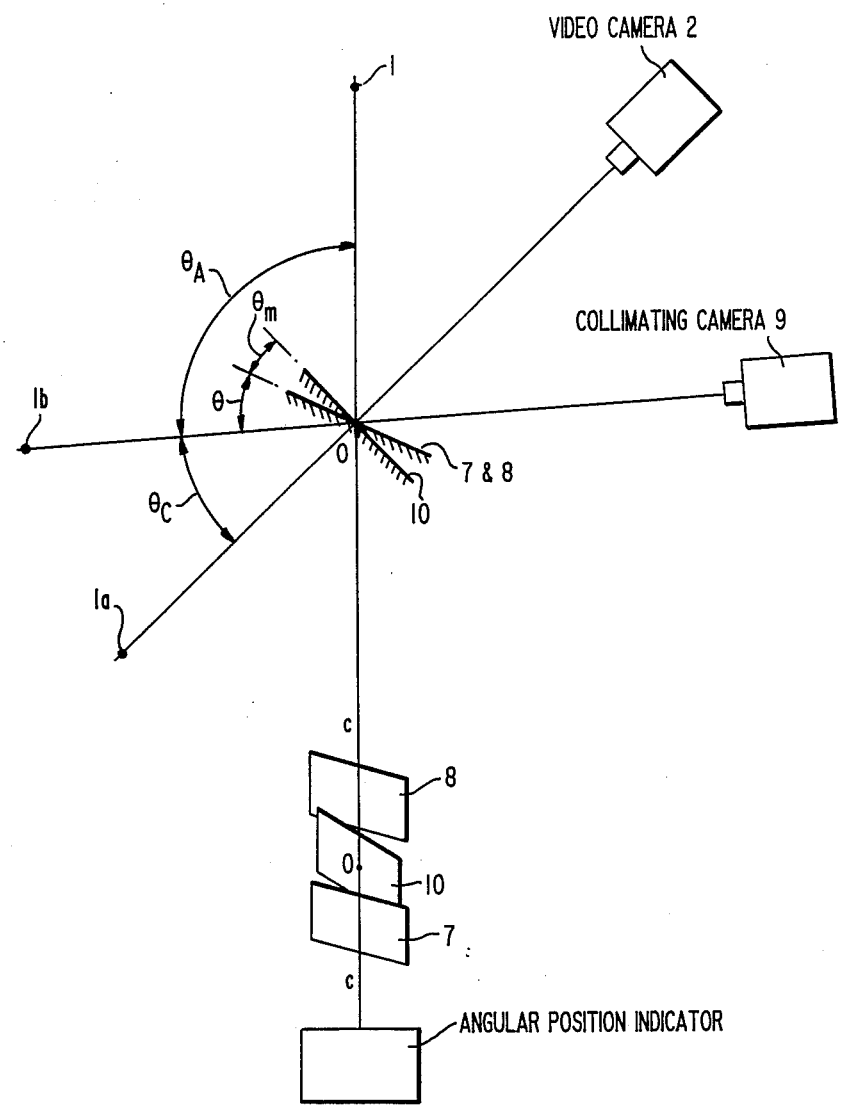

This novel arrangement and the advantages which arise from it will be better understood by making reference to the simplified diagram of FIG. 4 which shows various elements in the optical planes referred to. It will be apparent that by causing the collimating camera 19 to co-operate no longer with the real object 1 but with the virtual object 1b created by the mirror 10, it becomes possible to effect a telemetry operation on a substantial angular sector of the optical plane referred to without displacing in space the assembly of the telemetry and collimating cameras 2 and 9, by a simple rotation of three mirrors 7,8 and 10 about the axis cc perpendicular to the plane of the Figure shown diagrammatically in FIG. 4A.

To do this, it is necessary that the angle $\theta m$ of the mirror 10 with the mirrors 7 and 8 should be equal to one half of the angle formed by 0-1b and 0-1a and that the mirrors should be orientated as illustrated in the Figure. Outside the sector, centred at 0 covered by the cameras 2 and 9, it is possible to carry out the telemetry over all points situated in a sector such that $$\theta A = 2(\theta + \theta m)$$

referenced with respect to the axis of the collimating camera 9.

If the assembly formed by the mirrors 7,8 and 10 is equipped with an angular position indicator, it is then possible to determine, from angular parameters and by telemetry, the polar coordinates, with respect to the point 0, of each telemetry object.

Figure 5:
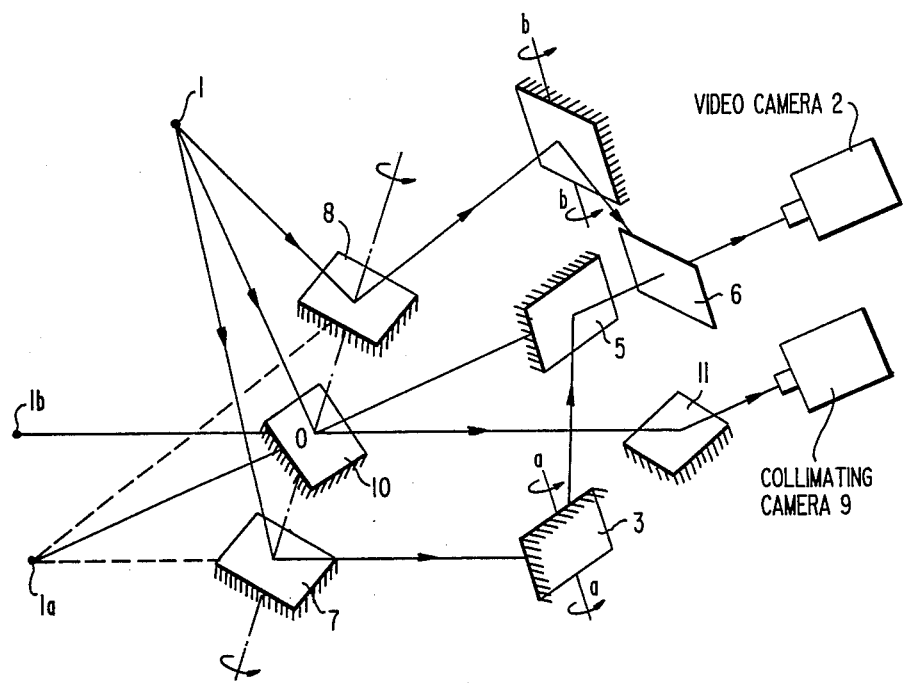
FIG. 5 illustrates a modification of the system illustrated in FIG. 3.

A further improvement is illustrated in FIG. 5. The same system is illustrated therein as in FIG. 3 but a mirror 11 enables "adjustment" of the optical path of the collimating camera 9, which enables it to be regrouped with the telemetry camera 2. It should be understood that a mirror such as mirror 11 can alternatively or additionally be placed on the optical path of the camera 2.

The device which has just been described enables conveniently to effect, over a substantial angular sector, telemetry operations, particularly in humanly inaccessible and hostile environments.

We claim:

1. In a collimating telemetry optical system for finding the distance of a viewed image comprising:
   two first mirrors each rotatable about an axis lying parallel to the axis of the other, synchronized in rotation to each other, and each lying in a respective, different optical path from an object to superposed images of the object, the two optical paths being of the same length, the said image defining with a reference point a first optical axis, and
   two second, co-planar, mirrors each located on a respective one of said optical paths and symmetrically with respect to the first optical axis,
   the arrangement being such that the telemetry is carried out on a virtual object, an image thus produced defining with the virtual object a second optical axis and wherein the plane constituted by said second mirrors is perpendicular to the plane constituted by said first and second optical axis.

2. A system according to claim 1, wherein a collimation is effected on a real object on the first optical axis.

3. A system according to claim 1, further comprising a third mirror disposed intermediate the two second mirrors, which third mirror intercepts the first optical axis so that a collimation is effected, by reflection in this third mirror, of a second virtual object.

4. A system according to claim 3, wherein the third mirror is rigid with the second mirrors to form an assembly, this assembly being rotatable about a common axis perpendicular to a plane defined by the first and the second optical axes.

5. A system according to claim 4, further comprising: an optical indicator, connected to the said assembly which indicator provides information regarding the angular orientation of the said assembly which, in combination with the telemetry information, enables determination of the polar coordinates of the location of a telemetry object situated at any point in the plane defined by the first and the second optical axes.

* * * * *

UNITED STATES PATENT AND TRADEMARK OFFICE
CERTIFICATE OF CORRECTION

PATENT NO. : 4,781,454

DATED : November 1, 1988

INVENTOR(S) : Alain Cazenave and Roland P.P. Tierrez

It is certified that error appears in the above-identified patent and that said Letters Patent is hereby corrected as shown below:

In column 1, line 39, change "utilisation" to --utilization--.

In column 1, line 49, change "collinating" to --collimating--.

In column 1, line 55, change "co-planar" to --coplanar--.

In column 3, lines 18 and 19, "camera 19 to co-operate" should read --camera 9 to cooperate--.

In column 3, line 32, change "centred" to --centered--.

In column 4, line 19, change "co-planar" to --coplanar--.

In column 4, line 27, change "axis" to --axes--.

Signed and Sealed this

Sixteenth Day of May, 1989

Attest:

DONALD J. QUIGG

*Attesting Officer*   *Commissioner of Patents and Trademarks*